Dec. 5, 1961 P. N. SCHMIDT, JR 3,011,588
AUTOMATIC SELF-CLEANING AND SIGNALLING STEAM STRAINER
Filed May 27, 1960

*INVENTOR.*
PETER N. SCHMIDT, JR.
BY
McMorrow, Berman & Davidson
ATTORNEYS

United States Patent Office 3,011,588
Patented Dec. 5, 1961

3,011,588
AUTOMATIC SELF-CLEANING AND SIGNALLING STEAM STRAINER
Peter N. Schmidt, Jr., 289 Gordon Ave., Fords, N.J.
Filed May 27, 1960, Ser. No. 32,357
8 Claims. (Cl. 183—42)

This invention relates to a novel automatic self-cleaning and signalling steam strainer.

The primary object of the invention is the provision of a more efficient and reliable steam strainer of the kind indicated, which comprises a trap valve leading to a condensing line of a steam installation, a strainer valve which opens to the atmosphere, and a single thermostatic bellows which operates both valves, the opening of the strainer valve producing a discharge of steam to the atmosphere which serves as an audible and visual signal of an interruption of flow of condensate from the strainer and through the strainer.

Another object of the invention is to provide a steam strainer of the character indicated above having the following important advantages:

(1) Lower in cost than existing combinations of strainer, blow-down valve, and trap;
(2) Prevents the associated steam installation from falling below a given temperature;
(3) Eliminates the need for and the trouble of periodically blowing-down the strainer;
(4) Gives clear signal if its automatic blow-down feature has unsuccessfully cleared the strainer and/or if the trap feature is inadequate, thereby enabling prevention of freezing of a steam installation in cold weather, by immediate servicing of the device;
(5) Eliminates need for the use of oversize traps to handle abnormal condensate peaks, as when, in an outdoor installation, the temperature falls to a rare low;
(6) In outdoor installations, the device prevents freezing and resulting rupture of the device or equipment being heated, by audibly and visibly signalling if and when the condensate is not moving through the device for any of the following reasons:
   (a) Plugged strainer;
   (b) Closed discharge valve;
   (c) A too high condensate pressure;
   (d) A rare condensate peak.
(7) The device drains automatically when the steam supply is shut off;
(8) Damage to the bellows, from too rapid openings of the supply valve, is reduced or eliminated;
(9) The device affords a neater, more compact installation;
(10) Installation cost of the device is less than for other similar devices;
(11) Points of possible leakage from the device are reduced; and,
(12) Reduced costs and expenses for stocking separate parts, such as strainer nipples, and blow-down valves.

Other important objects and advantageous features of the invention will be apparent from the following description and the accompanying drawings, wherein, for purposes of illustration only, a specific form of the invention is set forth in detail.

Figure 1:
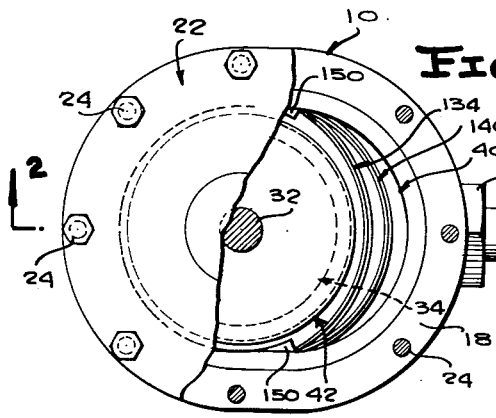
FIGURE 1 is a top plan view of a steam strainer of the present invention, with its cover plate partly broken away.

Referring in detail to the drawings, wherein like numerals designate like parts throughout the several views, the illustrated steam strainer comprises a preferably vertically elongated cup-shaped, oval or elliptical cross section body or housing 10, having a straight sidewall 12, and an irregular bottom wall 14, the sidewall 12 being surrounded, at its upper edge 16, by a lateral annular flange 18, having an upper surface 20 spaced above the upper edge 16. A cover plate 22 bears, at its peripheral edge, upon the upper surface 20 and is secured thereon, as by means of studs 24.

Figure 3:
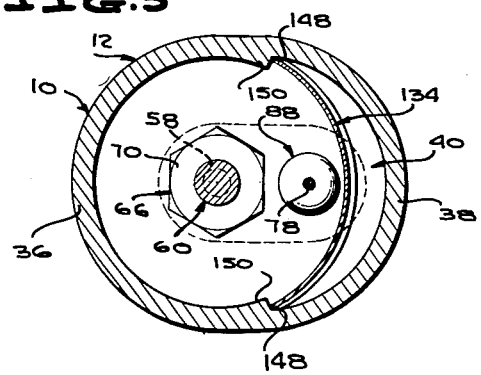
FIGURE 3 is a horizontal section taken on the line 3—3 of FIGURE 2.

The cover plate 22 has thereon an upstanding central boss 26, into which extends the upper part of an axial threaded socket 28 in the undersurface 30 of the cover plate. A threaded axial stud 32 on the upper end of a cylindrical bellows 34 is engaged in the socket 28, the bellows being smaller in diameter than and spaced from the housing sidewall 12. As shown in FIGURES 1 and 3, the bellows is displaced from the center of the housing 10 toward and is in concentrically spaced relationship to the first arcuate end portion 36, as distinct from the second arcuate end portion 38, of the sidewall 12, thereby providing in the housing between the bellows 34 and the end portion 38, a crescent-shaped screen chamber 40. The bellows 34 is of the thermostatic type and expands when heated by steam present within the housing 10.

An inverted cup-shaped imperforate bellows shield 42, slightly larger in diameter than the bellows 34, concentrically surrounds the bellows and is spaced from the housing sidewall 12. The shield 42 has a sidewall 44, having a free lower edge 46 located at the lower end of the bellows and a top wall 48 which is clamped between the upper end of the bellows and the cover plate 22 and has a central opening 50, through which the bellows stud 32 extends.

The bellows 34 has a rigid lower end plate 52 having a central downwardly extending reduced diameter flat circular boss 54 containing an axial threaded socket 56, into which is threaded a reduced upstanding axial stud 58 on a trap valve 60 which has a frusto-conical lower end 62 which is arranged to engage downwardly into the upper end of an axial bore 64 extending through a trap valve seat 66. The seat 66 is threaded downwardly in the bore of a downwardly extending neck 68 formed in the housing bottom wall 14, the seat having a lateral annular wrench-receiving flange 70 around its upper end.

Figure 6:
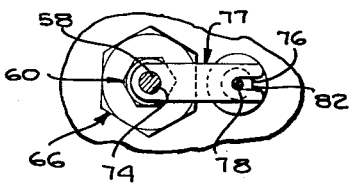

An elongated flat, horizontally disposed, relatively rigid strainer valve control arm 72, as shown in FIGURE 6, has an inner end which is provided with an opening 74 receiving the trap valve stud 58 and is clamped between the boss 54 and the trap valve 60. The outer end of the control arm 72 is formed with an open longitudinal slot 76, which receives the upper part of a vertical strainer valve stem 78, at a location between an enlarged upper head 80, on the upper end of the stem, and a similar lower head 82, which is spaced downwardly from the upper head 80, at a distance sufficient to provide for some lost motion, at times, between the control arm 72 and the heads 80 and 82.

Figure 2:
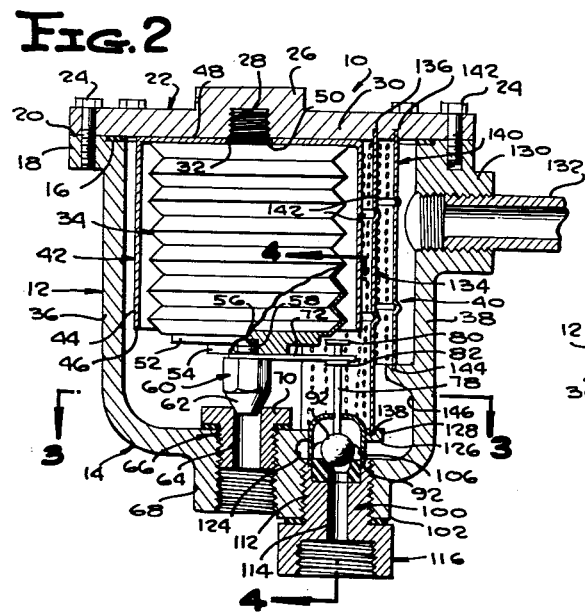
FIGURE 2 is a central vertical longitudinal section taken on the line 2—2 of FIGURE 1, showing the valves closed.
Figure 4:
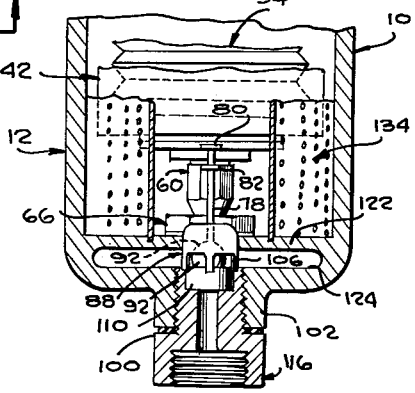
FIGURE 4 is a fragmentary vertical transverse section taken on the line 4—4 of FIGURE 2.
Figure 5:
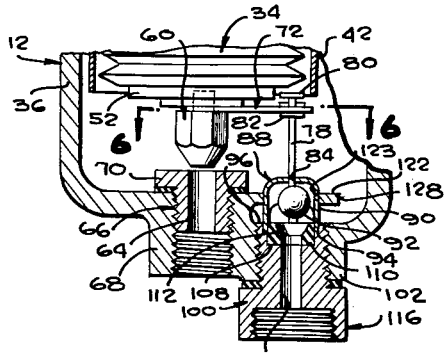
FIGURE 5 is a fragmentary view similar to FIGURE 2, showing the valves open; and, FIGURE 6 is a fragmentary horizontal section taken on the line 6—6 of FIGURE 5.

The strainer valve stem 78 extends downwardly through and is closely engaged with the central opening 84 in the top wall 86 of an inverted pressure differential cup 88, and a strainer ball valve 90 is fixed on the lower end of the stem 78, within the cup 88. The cup 88 has a cylindrical sidewall 92 having a lower edge 94 which is seated in an annular groove 96 which is formed in the upper end 98 of a strainer valve seat plug 100. The plug 100 is threaded in the bore of a neck 102 formed on and extending downwardly from the housing bottom wall 14, at the location which is eccentric with respect to the bellows 34, at the side thereof adjacent to the second housing sidewall end portion 38, and which places an edge portion of the upper head 80 of the strainer valve stem 78 at the undersurface of the bellows bottom plate 14, as shown in FIGURE 2. The cup sidewall 92 is formed with circumferentially elongated and spaced openings 106 spaced therearound, which open the lower edge 94, as seen in FIGURE 4. The plug 100 is formed in its upper end, within the groove 96, with an axial socket 108, in which is engaged a resilient and compressible strainer valve seat 110 having a flared ball valve seat 112 in its upper end, which opens to the upper end of a smaller diameter axial bore 114 which extends downwardly through the plug 100. The plug 100 extends below the neck 102 and has fixed on its lower end an enlarged diameter coupling socket 116. As seen in FIGURES 2 and 5, the strainer valve neck 102 is downwardly offset relative to the trap valve neck, and above the strainer valve neck 102 the housing bottom wall is formed with a portion 122 which is undercut to provide a flat horizontal pressure chamber 124, which spacedly surrounds the strainer valve pressure differential cup 88 and communicates with the sidewall openings 106 thereof, as shown in FIGURE 4, and which opens, as indicated at 126, to the interior of the housing 10, the bottom wall portion 122 having at this location an end 128 which is spaced from the second housing sidewall end portion 38 as seen in FIGURES 2 and 5, and an opening 123 passing the differential pressure cup 88.

The second end portion 38 of the housing sidewall 12 is formed, at the location near to and spaced below the upper end of the housing 10, with a radial lateral inlet neck 130, which opens into the screen chamber 40, as shown in FIGURE 2, and into which is adapted to be threaded a steam pipe 132 leading from a steam installation (not shown).

An inner arcuate fine mesh screen 134 is located in the chamber 40, and is closely concentrically spaced from the bellows shield 42, and extend vertically between the housing bottom wall portion 122 and the cover plate, as shown in FIGURE 2, and is seated, at related ends thereof, in groove 136 and 138 formed in the outer wall portion 122 and the cover plate. An outer coarser mesh arcuate screen 140 is concentrically spaced outwardly from the inner screen 134 and inwardly from the housing sidewall second end portion 38, is shorter than the inner screen 134, and is secured, at related ends, in a groove 142 in the underside of the cover plate, and in a groove 144 formed in the upper surface of an arcuate support ledge 146 projecting inwardly from the sidewall portion 138, at a location spaced above the bottom wall portion 122 and spaced from the inner screen 134. Both of the screens are preferably of spring sheet metal, formed at vertically spaced intervals with circumferentially extending ridigifying and reinforcing corrugations 147.

At their ends, the screens 134 and 140 are together engaged in vertical grooves 148 provided in vertical internal lands 150 provided, as shown in FIGURES 1 and 3, on the housing sidewall 12.

When the trap valve 60 and the strainer valve 92 are closed, as shown in FIGURE 2, and engaged with related seats 66 and 112, respectively, the control arm is depressed against the lower head 82 of the strainer valve stem 78, as shown in FIGURE 2, when the bellows 34 is in expanded condition. When the bellows 34 is in a contracted condition, the trap valve 60 is disengaged from and elevated from its seat 66, and the control arm 72 has engaged the underside of the upper strainer valve stem head 80 and elevated the strainer ball valve 92 partially off its seat 112, as shown in full lines in FIGURE 5, whereupon the ball 92 can be further elevated by the pressure within the chamber 124, as also shown in full lines in FIGURE 5. On both expansion and contraction of the bellows 34, the control arm 72 yields, upon initial contact with a strainer valve stem head 80, 82, is flexed by further expansion or contraction of the bellows, so that as the bellows approaches full expansion or contraction, sufficient tension is built up in the control arm 72 that the control arm then forcibly snaps the strainer ball valve 92 into or out of its seat 112, as the case may be.

In operation, the trap valve neck 68 is connected to a closed condensate line of a steam installation (not shown) and the inlet neck 130 is connected to a steam line 132 thereof. Initially the trap valve 60 and the strainer valve 92 are closed because the bellows is in expanded condition by the heat of the steam in contact therewith, and flow of condensate is absent. However, as condensate forms in the housing, cooling the bellows, the bellows gradually and periodically contracts only enough to open the trap valve 60 and discharge condensate to the condensate line, while the strainer valve 92 remains closed, there being sufficient lost motion for this purpose, between the control arm 92 and the heads 80 and 82 on the strainer valve stem, and pressure within the housing 10 being sufficient to keep the strainer valve seated and closed.

Should condensate fail to be discharged at normal temperature through the trap valve to the condensate line, the bellows 34 contracts further and the control arm 72 engages the upper head 80 of, and elevates and unseats the strainer valve 92, so that its pressure seal with the seat 112 is broken. The ensuing audible and visible rush of condensate to atmosphere, through the plug 100, in conjunction with the resultant low pressure within the differential cup 88, causes the strainer valve 92 to be flipped upwardly until the lower stem head 82 bears against the control arm 72 and the valve 92 is substantially spaced above its seat 112; and this produces a strong, audible, and visible signal of a blow-down. If the cause of this blow-down is a plugged screen, the pressure of incoming steam while one or both of the valves is open clears the screen and provides for dry steam to reach and expand the bellows and close both of the valves. Should intermittent and continuous blow-downs occur, it is a positive signal that maintenance attention is required.

The outer coarse mesh screen 140 serves to keep large particles, of such as weld slag, pebbles, and the like, within the screen chamber 40 and the pressure chamber 134, which together are large enough to hold several years of normal accumulation, much of which will, in time, be reduced in size and pass through the outer screen 140. The fine mesh inner screen 134 prevents smaller particles from reaching the trap valve 60 and its seat 66. This is important, because otherwise such small particles might lodge on the seat 66 and prevent complete closing and sealing of the valve 60 and result in thousands of pounds of steam loss without detection. The flip action of the strainer valve 92, and the fact that the same discharges to atmosphere, eliminates the need for screening of the strainer valve. Should positive seating of the strainer valve 92 be not obtained after a blow-down, the audible and visual signal is produced, and an attendant can correct the situation by simply closing either the steam supply valve (not shown) or the condensate discharge valve (not shown) for a short period of time and then re-opening such valves.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows.

2. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said connecting means comprising lost-motion means.

3. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, a screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said connecting means comprising a laterally extending control arm having an inner end secured to the second end of the bellows and a free outer end, said strainer valve having a stem extending therefrom and having a free end adjacent to the bellows, spaced stop heads on said stem at said free end, the outer end of the control arm being engaged between the stop heads, the stop heads being spaced from each other at a distance and positioned relative to the control arm to enable partial contractions and expansions of the bellows without actuation of the strainer valve.

4. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, screen means extending across the interior of the housing in said screen chamber, said second housing end wall having a condensate outlet axially aligned with the bellows, said second end of the bellows having a trap valve thereon for closing said outlet only in a heated and expanded thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said screen means comprising an inner fine-mesh screen extending between and secured at related ends to the first housing end wall and a portion of the second housing end wall, at the laterally outward side of said strainer valve, and an outer coarse-mesh screen shorter than said inner screen, said second housing sidewall portion having an internal ledge located in the region of the second end of the bellows and spaced from the second housing end wall and the lower end of the screen chamber, said outer screen extending between and secured at related ends thereof to the first housing end wall and said ledge and being spaced outwardly from the inner screen.

5. An automatic self-cleaning and signalling steam strainer, comprising a closed hollow housing having first and second end walls and a sidewall, a contractile thermotastic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, a screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said screen means comprising an inner fine-mesh screen extending between and secured at related ends to the first housing end wall and a portion of the second housing end wall, at the laterally outward side of said strainer valve, and an outer corase-mesh screen shorter than said inner screen, said second housing sidewall portion having an internal ledge located in the region of the second end of the bellows and spaced from the second housing end wall and the lower end of the screen chamber, said outer screen extending between and secured at related ends thereof to the first housing end wall and said ledge and being spaced outwardly from the inner screen, said portion of the second end wall of the housing being undercut to provide a pressure chamber surrounding the strainer valve seat, said portion being inwardly spaced from said second housing sidewall portion to provide communication between the screen chamber and said pressure chamber, an inverted pressure differential cup engaged through said second end wall portion, said cup having a sidewall having an open end surrounding the strainer valve seat and fixed to said second housing end wall and freely enclosing the strainer valve, said cup sidewall having opening means providing restricted communication between said pressure chamber and said blow-down outlet.

6. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, a screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said screen means comprising an inner fine-mesh screen extending between and secured at related ends to the first housing end wall and a portion of the second housing end wall, at the laterally outward side of said strainer valve, and an outer coarse-mesh screen shorter than said inner screen, said second housing sidewall portion having an internal ledge located in the region of the second end of the bellows and spaced from the second housing end wall and the lower end of the screen chamber, said outer screen extending between and secured at related ends thereof to the first housing end wall and said ledge and being spaced outwardly from the inner screen, said portion of the second end wall of the housing being undercut to provide a pressure chamber surrounding the strainer valve seat, said portion being inwardly spaced from said second housing sidewall portion to provide communication between the screen chamber and said pressure chamber, an inverted pressure differential cup engaged through said second end wall portion, said cup having a sidewall having an open end surrounding the strainer valve seat and fixed to said second housing end wall and freely enclosing the strainer valve, said cup sidewall having opening means providing restricted communication between said pressure chamber and said blow-down outlet, said cup having a top wall and said strainer valve having a stem working through said top wall and having a free end, said connecting means comprising a lateral control arm fixed to the second end of the bellows, and lost-motion means connecting said arm to the stem in the region of the free end of the stem.

7. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said condensate outlet having a trap valve seat removably engaged therein for sealing engagement by said trap valve.

8. An automatic self-cleaning and signalling steam strainer, comprising a closed hollow housing having first and second end walls and a sidewall, a contractile thermostatic bellows having a first end secured to said first end wall and a second end spaced from said second end wall, an imperforate shield secured to said first end wall and surrounding said bellows, said shield having an open end facing and spaced from said second end wall, said housing sidewall having opposed first and second portions, said second sidewall portion being substantially spaced from the bellows shield and providing a screen chamber therebetween, a steam inlet on said sidewall opening to said screen chamber, screen means extending across the interior of the housing in said screen chamber, said second housing end wall having a condensate outlet axially aligned with the bellows, said second end of the bellows having a trap valve thereon for closing said outlet only in a heated and expanded condition of the bellows, said second housing end wall having a blow-down outlet located at one side of said condensate outlet, and a strainer valve operatively connected to the bellows for closing the blow-down outlet in an expanded condition of the bellows, and in partially contracted conditions of the bellows, said blow-down outlet having a plug removably engaged therein, said plug having first and second ends and an axial bore extending therethrough, a compressible annular strainer valve seat body secured on the first end of the plug and having a seat opening communicating with said bore and engageable by the strainer valve only in its closed position.

References Cited in the file of this patent
UNITED STATES PATENTS

| | | |
|---|---|---|
| 1,467,818 | Smith | Sept. 11, 1923 |
| 1,656,373 | Fitts | Jan. 17, 1928 |
| 2,652,980 | St. Clair | Sept. 22, 1953 |